United States Patent

[11] 3,619,420

| [72] | Inventors | Frank N. Kemmer<br>La Grange;<br>Reed S. Robertson, Glen Ellyn; Rodney D.<br>Mattix, Lemont, all of Ill. |
|---|---|---|
| [21] | Appl. No. | 852,421 |
| [22] | Filed | Aug. 22, 1969 |
| [45] | Patented | Nov. 9, 1971 |
| [73] | Assignee | Nalco Chemical Company<br>Chicago, Ill. |

[54] SEWAGE TREATMENT PROCESS
2 Claims, No Drawings

[52] U.S. Cl.......................................... 210/6,
210/40, 210/152, 252/415, 252/422
[51] Int. Cl........................................... C02c 5/02
[50] Field of Search........................................ 210/3, 3–8,
18, 32, 45, 47, 46, 192, 152, 39, 40; 252/413, 415,
421, 422, 423

[56] References Cited
UNITED STATES PATENTS

| 1,535,797 | 4/1925 | Wickenden ................. | 252/422 |
| 1,903,834 | 4/1933 | Oberle.......................... | 252/422 |
| 1,915,240 | 6/1933 | Putnam ........................ | 210/7 X |

Primary Examiner—Michael Rogers
Attorneys—Johnston, Root, O'Keeffe, Keil, Thompson & Shurtleff, John G. Premo and Charles W. Connors

ABSTRACT: A continuous sewage treatment process for upgrading the quality of sewage plant effluent by converting sewage sludges to active substances and returning these active substances to the sewage system whereby removal of dissolved contaminants occurs by the addition of the active substances.

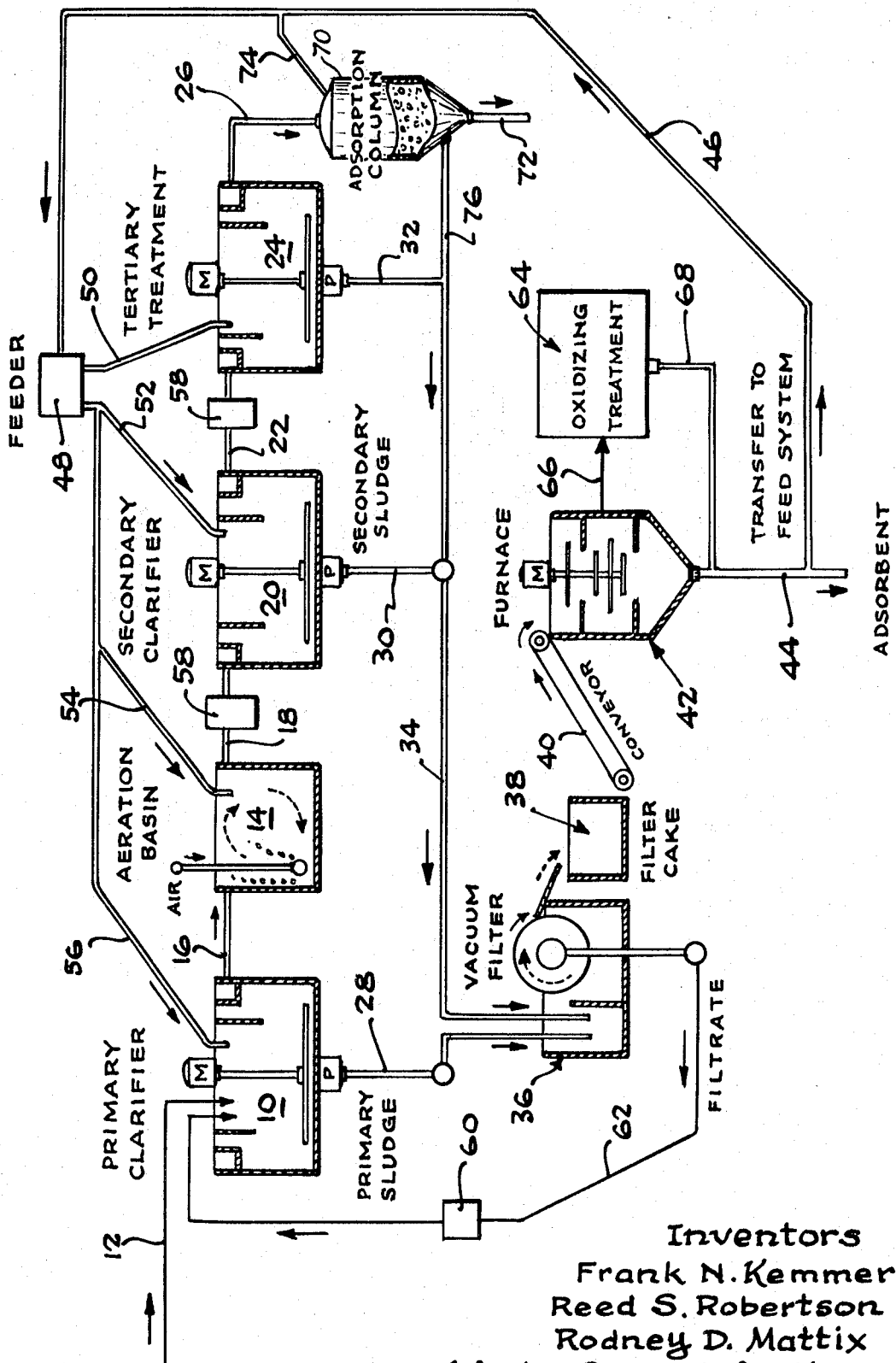

SEWAGE TREATMENT PROCESS

The disposal of sewage sludges resulting from large scale sewage treatment plants is a growing problem. Many schemes have been proposed to efficiently dispose of sewage sludges but, by and large, such systems have not been completely satisfactory. Sludge can be disposed of by incineration, which presents one feasible method of disposing of this material. However, the equipment required to effectively incinerate sludge is expensive and, often cannot be justified except in those instances where land fill or other methods of disposal are restricted.

Another proposed solution for effectively disposing of sludge is its conversion into fertilizer. This use of sludge requires elaborate equipment to dry and process the sludge and physically render it sterile and convert it into a form which is acceptable to the horticultural and agricultural industries.

Other schemes for disposal of sludge such as dumping into bodies of water and its use as land fill presents problems from a pollution standpoint. At the present time many regulator agencies prohibit the dumping of sludge into bodies of water due to its being a pollutant. In land fill disposal, the sludge must be dried and, in most instances, transported to an area where land is available or where there is a need of organic fill material.

With sewage sludge disposal problems becoming more marked in their severity from both a health and cost standpoint, it would be beneficial if a method were available whereby sludge could be converted into a valuable and useful product having economic value and which would not represent a disposal problem.

Population growth and industrial expansion is forcing a greater reuse of water and causing higher pollution loads. Of particular increasing concern is the increasing levels of organic material, particularly soluble forms, remaining in waste after normal processing through sewage treatment plants. There is a need to provide methods to overcome this by improving the performance of sewage treatment plants. Therefore, it would be of great benefit to the sewage treatment industry if it were possible to convert sludge into a substance which could be used in the sewage treatment process itself to improve its operational characteristics whereby the aqueous effluents from such processes would be rendered less harmful from a disposal standpoint.

If it were possible to convert sewage sludges into a useful water treatment agent, it would provide a great benefit to the sewage treating industry and to the general public.

OBJECTS OF THE INVENTION

It is an object of the invention to provide an improved method for handling and treating sewage sludge whereby it is converted into a useful product which may be used in a sewage treatment process, or which may be used as a valuable product of commerce.

It is a further object of this invention to provide an improved sewage treatment process which produces an active substance which, in turn, can be used in the sewage system to remove dissolved contaminants.

A further object of this invention is to produce an active substance by means of a one-step heating mechanism which not only chars the sludges, but also conditions the chars to make the active substance.

Further objects will be apparent in the specifications.

THE INVENTION

The present invention is directed to a method of improving sewage treatment processes by converting sewage sludges into a valuable active substance for return to the sewage treatment system. In a specific embodiment of the invention a method is provided for improving the operational efficiency of sewage treatment plants whereby at least a portion of the sludge produced by such plants is converted into an active substance. At least a portion of this active substance is then used in these plants as a water-treating aid to improve the overall quality of the waste effluent waters produced by such plants mostly by removing soluble pollutants and whereby the sludges may be efficiently disposed of without danger of pollution or other sanitation problems arising.

THE DRAWING

With particular references to the drawing, there is shown schematically in oversimplified form a typical sewage treatment plant.

Specifically the plant is composed of a primary clarifier 10 into which raw sewage is fed through line 12. The primary clarifier sludge is separated from the liquid phase of the sewage, with the liquid being passed to an aeration basin 14 through line 16. After the liquid is aerated in the aeration basin, it is moved through line 18 to a secondary clarifier 20 where the additional solids are removed by sedimentation procedures. The supernatant effluent from clarifier 20 passes through line 22 to an optional tertiary treatment zone or stage 24, where any remaining insoluble solids are removed to provide a final effluent which is discharged through line 26.

In the primary clarifier, at least a portion of the soluble organic waste may be converted into a sludge.

An optional step is to include an adsorption column 70 into which the final effluent is discharged through line 26 for removal of soluble solids. The effluent from column 70 is discharged through line 72.

Sludge removed in clarifiers 10 and 20 pass from these units through lines 28 and 30 respectively, and in some cases the fill from an exhausted column 70 from the tertiary treatment, could also be fed to a common feed line 34 where the sludges are combined and then deposited onto vacuum filter 36. The combined sludges are dewatered in vacuum filter 36 and passed into a filter cake storage unit 38, where they are removed by conveyor 40 to a charring and conditioning furnace 42.

A portion of the sludge from line 30 may be recirculated to line 16.

Sludges entering furnace 42 are subjected to heat treatment in a controlled atmosphere with a conditioning magnet present during which the residual moisture of the cake is removed and it is converted into the active substance of the invention. The active substance is then removed from furnace 42 through line 44 and transferred through line 46 as a slurry to feeder 48. The active substance is mixed and fed through one or more of a series of supply lines 50, 52, 54, and 56 to choice of lines 12, 16, 18, 22 and 26 where it is used to improve the clarity and quality of a supernatent effluent leaving any or each of these units. In some plants a single application point may produce the desired results, while in other plants a plurality of addition points may be necessary. In particular, the active substance reduces the soluble solids in the supernatent effluent. The active substance may additionally be used as a filter media for line filters 58 and 60 which service line 18 and the filtrate feed line 62 on the vacuum filter 36, and as the final treatment stage in column 70.

As will be noticed from the drawing, the active substance is made from a variety of sludges entering the vacuum filter 36 from the primary clarifier 10, the secondary clarifier 20, the tertiary treatment 24, and the exhausted adsorption column 70. This invention contemplates using sludge from any of the sources involved in a sewage treatment process.

THE FURNACE

The heating treatment in the presence of a conditioning magnet produces the active substance of this invention. Heating sewage in a furnace to high temperatures is known in the art as incineration. Heating sewage in a furnace without a conditioning agent produces a waste ash which is disposed of relatively easily, but has no activity in terms of the present invention.

The furnace must be designed to withstand the fumes generated in the heating step. A kiln can also be used as the furnace and not depart from the subject matter of the invention. The temperature of the furnace can range from 300° to 900° C. Preferably, the temperature should be from 500° to 700° C. It has been found that at least three minutes are needed to achieve any sort of significant activation. The time can range from 3 to 200 minutes, depending upon the sludges used and the conditioning agents. The time and temperature can be varied to achieve the best working arrangement. The pressure can be used and may be beneficial in some cases. Under the right conditions, a partial vacuum may be used in the practice of this invention.

CONDITIONING AGENTS

Conditioning agents are known to the art and can consist of any organic or inorganic compound that are acidic and produce acidic byproducts under the furnace conditions. By way of example, acidic chloride conditioning agents can be used. These acidic chloride conditioning agents can be selected from the group consisting of $ZnCl_2$, HCl, $FeCl_3$, $NH_4Cl$ $AlCl_3$, $NiCl_2$, and $SnCl_2$. Preferably, gaseous HCl can be used as a conditioning agent. Acidic phosphate conditioning agents can be used as a conditioning agent. Acidic phosphate conditioning magnets can also be used, and these are selected from the group consisting of $H_3PO_4$, $NaH_2PO_4$, and $Na_2HPO_4$.

Carbonate activating agents can also be used. These compounds can be bicarbonate salts, carbonate salts or even carbon dioxide and carbon monoxide under appropriate conditions.

Organic chloride compounds could also be used. An example of this would be the chlorinated organic residues from the production of PVC (Polyvinyl Chloride.) This organic residue would release HCl in the furnace.

Using gaseous HCl has been found fully effective as an activating agent.

The dosage of the the conditioning agents should be from 0.1–50 percent by weight based on the dry weight of the sludges. Preferably, the furnace should contain from 1 percent to 25 percent by weight of the conditioning agents based on the dry weight of the sludges.

THE ACTIVE SUBSTANCES

The active substance produced in accordance with the invention is a unique material in that while it usually contains at least 20 percent weight inorganic material in the form of their oxides or in the form of inorganic salts, it may exceed 60 percent by weight inorganic material. In most instances the inorganic portion of the active substance produced in accordance with the invention will range between 20 –50 percent by weight. The inorganics present in the active substances are composed of a variety of oxides and salts, usually metals, with, in most cases, at least 5 percent by weight thereof and in certain instances from 10 –30 percent by weight of the inorganic component being composed of silica, expressed as $SiO_2$. The inorganic portion of the active substance, using the preferred conditioning agent of the invention, is primarily derived from the inorganic substances normally found in sewage sludges. Typical analyses of sewage sludges obtained from Downers Grove, Illinois, Sewage Treating Plant is presented in the following Table I.

TABLE I

CHEMICAL CONSTITUENTS OF SLUDGES

| Chemical Constituent | (% dry solids) | |
|---|---|---|
| | Digested Sludge | Activated Sludge |
| $SiO_2$ | 15.6 | 8.45 |
| $Fe_2O_3$ | 5.43 | 7.15 |
| $Al_2O_3$ | 6.8 | 3.21 |
| CaO | 6.64 | 1.67 |
| MgO | 1.83 | 1.81 |
| $K_2O$ | 0.42 | 0.86 |
| $Na_2O$ | | 0.99 |
| $TiO_2$ | | 0.083 |
| MnO | 0.0038 | |
| CuO | 1.0 | 0.047 |
| BaO | 0.06 | 0.061 |
| ZnO | 1.24 | 0.016 |
| PbO | 0.81 | 0.23 |
| NiO | | 0.006 |
| CoO | | 0.002 |
| $SO_3$ | 8.12 | 2.9 |
| $Cl_2$ | | 0.50 |
| $Cr_2O_3$ | 0.37 | 0.22 |
| $As_2O_3$ | 0.13 | 0.013 |
| $B_2O_3$ | | 0.0043 |
| $I_2$ | | 0.0011 |
| $P_2O_5$ | 2.02 | 3.09 |
| Ignition Loss | 44.4 | 68.55 |
| Total | 95.65 | 99.90 |

The balance of the active substances is basically a form of carbon which is derived from the organic portion of the sewage sludges when they are subjected to the charring and conditioning step of the furnace 42 of the drawing.

The active substances of the invention, in addition to being capable of aiding in the removal of suspended solids from sewage treating effluents, have the additional advantage of removing dissolved contaminants, particularly dissolved organic matter. The active substances can be fed into the primary clarifier, the aeration basin, the secondary clarifier and used in tertiary treatment. This tertiary treatment may involve the use of the active substances in a column as a filter bed and adsorption media. The active substances have a high capacity for adsorbing dissolved contaminants. Further, the active substances when combined with sludges in the sewage process aids in settling, reduces bulking, and helps in the dewatering steps by reducing the chemicals required and improving sludge handling characteristics. When the active substances are fed into the respective tanks, the treatment level should be such as to obtain at least 100 p.p.m. during the course of exposure, in order to have a significant effect on the reduction of contaminants present. Preferably, the treatment level should be at least 500 p.p.m. In a preferred embodiment of the invention, the active substance is thoroughly mixed, with the influent before entering the tanks to achieve maximum efficiency in the respective tanks.

EXAMPLES

To illustrate the fact that the dried sewage sludges are capable of being converted into a useful active substance, the following is presented by way of example.

Imhoff sludge, a partially digested raw sludge, was obtained from the Metropolitan Sanitary District of Greater Chicago and conditioned with an acrylamide coagulant type polymer, filtered and dried. The dried sludge was mixed 1:1 with zinc chloride, wet with water and extruded. The ⅛-inch extrudate produced was dried overnight and then subjected to a heat treatment. The extrusion was merely an optional step, and is not absolutely necessary to practice the invention.

Samples of the extrudate were heated for periods of time ranging between 10 minutes to 3 hours at 650° C. in a nitrogen stream. A laboratory tube furnace was found to be quite satisfactory for this purpose. Samples were cooled in each case in the inlet nitrogen stream before removal from the tube. Typical samples were taken from the furnace, cooled and then analyzed for the various components present therein. An analysis of the two samples are presented below in TABLE II.

TABLE II

| | Sample I % | Sample II % |
|---|---|---|
| Calculated Loss 800° C. | 19.4 | 17.4 |
| $ZnCl_2$ loss at 800° C. | 10.0 | 14.7 |
| $Al_2O_3$ | 15.2 | 26.4 $SiO_2$ |
| $P_2O_5$ | 2.6 | 2.7 |
| $SO_3$ | 2.9 | 3.3 |

| | | |
|---|---|---|
| Cl₂ | 0.0 | 0.0 |
| Na₂O | 2.0 | 0.5 |
| K₂O | 0.3 | 0.4 |
| MgO | 2.8 | 2.3 |
| CaO | 6.8 | 6.7 |
| Cr₂O₃ | 0.9 | 0.9 |
| Fe₂O₃ | 10.5 | 10.4 |
| NiO₂ | 0.3 | 0.2 |
| CuO | 1.2 | 1.2 |
| ZnO | 18.4 | 13.1 |

Sample I of Table II removed 91 percent TOC (total organic carbon) in an equilibrium type test. Sample II of Table II removed 92 percent TOC under similar conditions.

These results combined with knowledge of the art indicate that the average plant employing a properly running activated sludge process could be expected to produce sufficient active substance for their own needs. Any excess active substance may be used elsewhere in the plant. For example, the excess could be used to purify stack gases. The excess could be sold for industrial and agricultural uses. The level of recycle of active substance will vary. The scheme presented by this invention may be employed in conjunction with a wide variety of waste disposal plants now in existence. Such plants may be considered as being composed of at least one sludge settling zone, and a sludge dewatering zone. This sludge settling zone may comprise a number of independent units such as primary and secondary clarifiers. The dewatering zone may comprise vacuum filters such as are shown in the drawing and may be in the nature of sludge drying beds or the like.

It is understood that the typical large sewage plants may include other units, such as elutriators, thickeners, digesters, as well as vacuum filters, centrifuges and the like. The sludges may be produced as a result of any conventional sewage treatment process.

Prior to being subjected to the heat treatment portion of the process it is beneficial that the sludges be sufficiently dewatered so that it contains not more than 85 percent by weight of moisture. The active substances produced in accordance with the invention may be used in any or all of the various clarification treatment operations normally performed in sewage treatment plants. Excess active substances may be sold as a commercial product. Preferably the active substance is added to the effluent from the aeration basin. The recycled sludge from the secondary clarifier returned to the aeration basin would then normally contain the active substance as well as the normal sludge. This may allow the size of the basin needed in the sewage system to be greatly reduced. The active substance can also be used in a tertiary treatment step as a final polish on the effluent.

Under some conditions it may be desirable to include a washing step after the active substance is discharged from the furnace. This washing step would remove soluble contaminants from the substance and allow them to be properly controlled in the sewage treatment system.

The following tables illustrate some of the tests that have been run varying the conditioning agents, the amount of conditioning agent, time of conditioning, and furnace condition.

TABLE III $ZnCl_2$

| | % Removal TOC | |
|---|---|---|
| % $ZnCl_2$ | No wash | Acid Washed |
| 5 | 3 | 12 |
| 25 | 18 | 53 |
| 50 | 40 | 98 |

TOC means total organic carbon

As can readily be seen from TABLE III, increasing the amount of the conditioning agent increases the amount of removal of the total organic carbon. Also, when the activated substance is acid washed after removal from the furnace and before returning to the sewage system the amount of zinc chloride needed to produce the same amount of removal of total organic carbon is reduced. Therefore, the acid wash is beneficial in removing soluble organic species from the substance.

TABLE IV

25 Percent by Weight Chlorides

| Activating Agent | % Removal TOC |
|---|---|
| HCl | 70 |
| HCl (gas 10%) | 75 |
| $NH_4Cl$ | 71 |
| $SnCl_2$ | 53 |
| $FeCl_3$ | 53 |
| $ZnCl_2$ | 51 |
| $AlCl_3$ | 42 |
| $CaCl_2$ | 38 |
| $NiCl_2$ | 35 |
| $MgCl_2$ | 21 |

Table IV shows different chloride conditioning agents and the amount of total organic carbon that they remove. As can readily be seen gaseous HCl was the most effective. Liquid HCl, ammonium chloride, stannous chloride, ferric chloride, and zinc chloride were also very effective.

TABLE V

25 Percent by Weight Phosphates

| Activating Agent | % Removal TOC |
|---|---|
| $H_3PO_4$ | 72 |
| $AlPO_4$ | 3 |
| $AlPO_4$ (acid washed) | 48 |
| $NaH_2PO_4$ | 2 |
| $NaH_2PO_4$ (acid washed) | 18 |
| $Na_2HPO_4$ | 1 |
| $Na_2HPO_4$ 2 washed) | 2 |
| $Na_3PO_4$ | 2 |
| $Na_3PO_4$ (acid washed) | 17 |
| $Ca_3PO_4$ | ** 2 |
| $Ca_3PO$ (acid washed) | 17 |
| $FePO_4$ | 2 |
| $FePO_4$ (acid washed) | 15 |

Table V shows the phosphates being used as the conditioning agent. By far the most effective phosphate was the phosphoric acid. Aluminum phosphate showed some removal of the total organic carbon when the activated substance was acid washed. Such phosphates as ferric phosphate showed no appreciable activity even after it was acid washed.

TABLE VI $CO-CO_2-CO_3$

| Activating Agent | % Removal TOC |
|---|---|
| CO | 24 |
| Dry $CO_2$-Wet Sludge | 38 |
| Wet $CO_2$-Dry sludge | 2 |
| $NaHCO_3$ (25%) | 1 |
| $NaHCO_3$ (50%) | 1 |
| $NaHCO_3$ (50% with Acid Wash) | 67 |
| $Na_2CO_3$ (25% | 1 |
| $Na_2CO_3$ (25% with Acid Wash) | 18 |

Table VI shows various carbonate compounds being used as conditioning agents. Carbon dioxide was effective when using a wet sludge. This is probably because an acidic carbon compound is formed. Sodium bicarbonate was effective when followed by an acid wash.

In the above tables, the temperature of the furnace was 600° C. The time in the furnace was about 10 minutes at temperature. The pressure was slightly over one atmosphere so as to maintain a positive pressure within the furnace. The moisture of the sludge was about 40 percent by weight.

Organic chlorides were also tested and found to be effective. Such compounds would be economical if they were the waste products of some organic process, such as the production of polyvinyl chloride in which the residue contains a high amount of chloride which upon heating would release HCl gas which could be used as the activating agent to make the activated substance of this invention. Tests have shown that this is effective.

Example 1 of Organic Chlorides

Five grams of polyvinyl chloride residue was used as a source of hydrogen chloride. Fifteen grams of Imhoff sludge (previously described) was added as a wet paste. The sludge and the conditioning agent were charged to the furnace. The furnace was heated for 30 minutes at 650° C. The resulting active substance showed a 60 percent removal of the total organic carbon.

Example 2 of Organic Chlorides

Five grams of organic chloride 711 was substituted for the polyvinyl chloride residue of example 1. Organic chloride 711 is a hydrocarbon oil having a molecular weight of about 400, which has been chlorinated. The same conditions were used. The resulting active substance showed a 53 percent removal of the total organic carbon.

These activating agents have been tested at other temperatures within the range described in this invention and have been found to be effective. The time has also been varied as likewise found to be effective. The time has also been varied as likewise has the pressure. The moisture of the sludge is also another variable that has been studied. The range used in the claims has been found to be the most effective to make the activating substance of this invention.

Table VII shows the effect of temperature.

TABLE VII

Effect of Temperature (Time was 10 minutes)

| Sample No. | Temp. (° C.) | Yield | % Removal TOC |
|---|---|---|---|
| 1 | 365° | 49% | −42% |
| 2 | 500° | 36% | 41% |
| 3 | 600° | 33% | 41% |
| 4 | 700° | 20% | 44% |

As can be seen from the table, increasing the temperature decreases the yield but increases the removal of total organic carbon. At 365° C., the removal of total organic carbon was a negative value. This indicates that the soluble organic species from the substance added contaminants to the system rather than removing soluble organics from the system.

Table VII shows the effect of time of activation.

TABLE VIII

Effect of Time

| Sample No. | Temp. (° C.) | Time | Yield | % Removal TOC |
|---|---|---|---|---|
| 1 | 600° | 5 | 36% | 53% |
| 2 | 600° | 10 | | 41% |
| 3 | 600° | 15 | >33% | 38% |
| 4 | 500° | 5 | <44% | −155% |
| 5 | 500° | 10 | 44% | 43% |
| 6 | 500° | 30 | 36% | 41% |

As shown by the table, increasing the time beyond a certain point decreases the yield and the removal of total organic carbon.

SUMMARY

This invention involves a process of treating sewage so as to form an active substance useful in removing soluble contaminants in the sewage system. By the use of conditioning agent, appropriate temperature and time, an active substance is produced.

We claim:

1. A continuous sewage treatment process, comprising the steps of:
   A. removing at least a portion of the sludges from the sewage system;
   B. dewatering the sludges such that said sludges contain from about 10 percent to 85 percent water;
   C. heating the dewatered sludges at a temperature of from 300° to 900° C. for from 3 to 200 minutes at a pressure of at least one atmosphere absolute, in a controlled atmosphere, after adding from 0.1 percent to 50 percent, based on the dry weight of the sludges of an acidic conditioning agent selected from the group consisting of HCl and gaseous HCl;
   D. removing at least a portion of the sludges which is now active substance; and
   E. mixing said active substance in the sewage system so as to achieve a concentration level greater than 100 p.p.m. in the system whereby removal of dissolved organic contaminants occur by the addition of said active substance.

2. The continuous sewage treatment process of claim 1, which includes the additional step of:
   washing said active substance with a liquid selected from group consisting of water and dilute acid to remove the soluble components before returning said active substance to the sewage system, so as to achieve a concentration level greater than 100 p.p.m. in the system whereby removal of the dissolved organic contaminants occurs by the addition of said active substances.

* * * * *

PO-1050
(5/69)

UNITED STATES PATENT OFFICE
CERTIFICATE OF CORRECTION

Patent No. 3,619,420      Dated November 9, 1971

Inventor(s) Frank N. Kemmer et al

It is certified that error appears in the above-identified patent and that said Letters Patent are hereby corrected as shown below:

Column 2, line 42, "magnet" should read -- agent --.

Column 3, line 22, "NH4Cl" should read -- $NH_4Cl$, --; line 69, "Chemical 24" should read -- Chemical --.

Column 4, line 2, "00078" should read -- 0.78 --; line 2, in the far right-hand column of the table, insert -- 0.033 --; line 73, "$Al_2O_3$     16.2     29.5$SiO_2$" should read
-- $Al_2O_3$     5.1     5.4
    $SiO_2$     16.2     20.5 --.

Column 6, in Table IV, "(gas 10%" should read -- (gas 10%) --; in Table V, "2 washed)" should read -- (acid washed) --; in Table V, "**2" should read -- 2 --.

Column 8, line 5, "VII" should read -- VIII --; in Table VIII, "10%" should read -- 10 --; in Table VIII, sample 2, under "Yield", insert -- 33% --; in Table VIII, sample 4, "<44%" should be under "Yield".
First page, left-hand column, "No drawings" should read
-- One drawing figure --.

Signed and sealed this 16th day of May 1972.

(SEAL)
Attest:

EDWARD M. FLETCHER, JR.
Attesting Officer

ROBERT GOTTSCHALK
Commissioner of Patents